(12) United States Patent
Denbo et al.

(10) Patent No.: US 10,807,506 B2
(45) Date of Patent: Oct. 20, 2020

(54) CHILD RESTRAINT WITH MOVABLE HEADREST

(71) Applicant: Dorel Juvenile Group, Inc., Foxboro, MA (US)

(72) Inventors: Sean R. Denbo, Columbus, IN (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 16/222,060

(22) Filed: Dec. 17, 2018

(65) Prior Publication Data

US 2019/0184864 A1 Jun. 20, 2019

Related U.S. Application Data

(60) Provisional application No. 62/599,961, filed on Dec. 18, 2017.

(51) Int. Cl.
| | | |
|---|---|---|
| B60N 2/26 | (2006.01) | |
| B60N 2/28 | (2006.01) | |
| B60N 2/80 | (2018.01) | |
| B60N 2/806 | (2018.01) | |
| B60N 2/812 | (2018.01) | |
| B60N 2/818 | (2018.01) | |

(52) U.S. Cl.
CPC .......... *B60N 2/2851* (2013.01); *B60N 2/286* (2013.01); *B60N 2/2872* (2013.01); *B60N 2/818* (2018.02)

(58) Field of Classification Search
CPC .... B60N 2/2851; B60N 2/286; B60N 2/2872; B60N 2/818
USPC .......................................... 297/250.1–256.16
See application file for complete search history.

(56) References Cited

U.S. PATENT DOCUMENTS

| | | | |
|---|---|---|---|
| 5,845,968 A | 12/1998 | Lovie | |
| 6,030,047 A * | 2/2000 | Kain | B60N 2/2812 297/250.1 |
| 6,135,553 A | 10/2000 | Lovie et al. | |
| 6,491,348 B1 * | 12/2002 | Kain | B60N 2/2812 297/250.1 |
| 6,908,151 B2 | 6/2005 | Meeker et al. | |
| 7,032,969 B1 | 4/2006 | Campbell | |
| 7,246,852 B2 * | 7/2007 | Balensiefer | B60N 2/2851 297/250.1 |
| 7,306,284 B2 * | 12/2007 | Horton | B60N 2/2812 297/250.1 |
| 7,438,358 B2 | 10/2008 | Jane Santamaria | |
| 7,452,031 B2 | 11/2008 | Woellert et al. | |
| 7,862,117 B2 * | 1/2011 | Hutchinson | B60N 2/2806 297/250.1 |
| 7,954,895 B2 | 6/2011 | Freeman et al. | |
| 8,087,725 B2 * | 1/2012 | Hutchinson | B60N 2/2806 297/250.1 |
| 8,282,165 B2 | 10/2012 | Kespohl | |
| 8,342,604 B2 | 1/2013 | Heisey et al. | |

(Continued)

*Primary Examiner* — Rodney B White
(74) *Attorney, Agent, or Firm* — Barnes & Thornburg LLP

(57) ABSTRACT

A juvenile vehicle seat includes a seat bottom and a seat back comprising a backrest and an adjustable headrest. The juvenile vehicle seat also includes a mount for the adjustable headrest. The mount is coupled to the backrest to support the adjustable headrest for movement relative to the backrest.

23 Claims, 10 Drawing Sheets

(56) References Cited

U.S. PATENT DOCUMENTS

| | | | |
|---|---|---|---|
| 8,496,293 B2* | 7/2013 | Gaudreau, Jr. | B60N 2/2809 297/250.1 X |
| 9,067,516 B2 | 6/2015 | Hutchinson et al. | |
| 9,415,707 B2 | 8/2016 | Bohm | |
| 2002/0041117 A1* | 4/2002 | Yamazaki | B60N 2/2806 297/256.13 |
| 2002/0043837 A1* | 4/2002 | Kain | B60N 2/2812 297/250.1 |
| 2004/0124677 A1* | 7/2004 | Meeker | B60N 2/2806 297/255 |
| 2005/0189806 A1* | 9/2005 | Hall | B60N 2/2851 297/256.11 |
| 2005/0212342 A1* | 9/2005 | Kain | B60N 2/2851 297/256.11 X |
| 2005/0242642 A1 | 11/2005 | Kespohl | |
| 2007/0063556 A1* | 3/2007 | Santamaria | B60N 2/2812 297/250.1 |
| 2007/0188002 A1* | 8/2007 | Jane Santamaria | A47D 13/02 297/256.1 |
| 2007/0236061 A1* | 10/2007 | Meeker | B60N 2/20 297/250.1 |
| 2007/0246982 A1* | 10/2007 | Nett | B60N 2/2851 297/256.1 |
| 2010/0187879 A1* | 7/2010 | Brandl | B60N 2/2851 297/250.1 |
| 2010/0264705 A1* | 10/2010 | Karremans | B60N 2/2851 297/250.1 |
| 2012/0098304 A1* | 4/2012 | Gaudreau, Jr. | B60N 2/2812 297/216.11 |
| 2012/0098309 A1* | 4/2012 | Gaudreau, Jr. | B60N 2/2812 297/256.11 |
| 2012/0153690 A1* | 6/2012 | Gaudreau, Jr. | B60N 2/2821 297/250.1 |
| 2012/0175921 A1* | 7/2012 | Gaudreau, Jr. | B60N 3/101 297/256.11 X |
| 2012/0242127 A1* | 9/2012 | Gaudreau, Jr. | B60N 2/2812 297/250.1 |
| 2012/0292965 A1* | 11/2012 | Sedlack | B60N 2/2812 297/256.16 |
| 2012/0313413 A1* | 12/2012 | Hutchinson | B60N 2/2812 297/250.1 |
| 2014/0008952 A1* | 1/2014 | Spence | B60N 2/265 297/256.1 |
| 2014/0021758 A1* | 1/2014 | Chen | B60N 2/26 297/256.11 |
| 2014/0077545 A1* | 3/2014 | Neuber | B60N 2/2812 297/256.1 |
| 2016/0114705 A1* | 4/2016 | Morgenstern | B60N 2/2851 297/250.1 X |
| 2016/0114706 A1* | 4/2016 | Hutchinson | B60N 2/2875 297/256.13 |
| 2016/0144749 A1* | 5/2016 | Mo | B60N 2/22 297/256.11 |
| 2017/0008429 A1* | 1/2017 | Johnson | B60N 2/2872 |
| 2017/0113576 A1* | 4/2017 | Jane Santamaria | B60N 2/2806 |
| 2018/0222358 A1* | 8/2018 | Oswald | B60N 2/2857 |
| 2019/0176662 A1* | 6/2019 | Pleiman | B60N 2/2806 |

\* cited by examiner

US 10,807,506 B2

CHILD RESTRAINT WITH MOVABLE HEADREST

PRIORITY CLAIM

This application claims priority under 35 U.S.C. § 119(e) to U.S. Provisional Application No. 62/599,961, filed Dec. 18, 2017, which is expressly incorporated by reference herein.

BACKGROUND

The present disclosure relates to a child restraint, and particularly to a child restraint including a juvenile seat. More particularly, the present disclosure relates to a juvenile seat including a movable headrest.

SUMMARY

According to the present disclosure, a child restraint includes a juvenile vehicle seat including a seat bottom and a seat back coupled to the seat bottom and arranged to extend upwardly away from the seat bottom. The seat back includes a backrest coupled to the seat bottom and a movable headrest arranged to move up and down relative to the backrest.

In illustrative embodiments, the seat back includes a modular headrest unit that can be pre-assembled and then mounted on a front side of the backrest. The modular headrest unit comprises the movable headrest and a headrest-mount platform located in a stationary position on the backrest and arranged to extend upwardly in a direction away from the seat bottom toward an upper end of the backrest. The movable headrest is mounted for up-and-down movement on a front side of the headrest-mount platform that is located in a stationary position on the front side of the backrest. The movable headrest includes a rearwardly extending headrest lock that can be operated by a caregiver, to engage any one of the several vertically spaced-apart lock receivers formed in the headrest-mount platform to establish the height of the movable headrest above the seat bottom.

In illustrative embodiments, the headrest-mount platform includes a guide plate formed to include a vertically extending lock-transit channel sized to receive the rearwardly extending headrest lock that is included in the movable headrest during up-and-down movement of the movable headrest relative to the headrest-mount platform. Each lock receiver opens into the vertically extending lock-transit channel to allow the headrest lock to extend into one of the lock receivers when the movable headrest arrives at an elevation associated with that lock receiver.

In illustrative embodiments, the headrest-mount platform also includes a tail-extension support insert that is mounted on a lower portion of the guide plate. The tail-extension support insert is configured to cover an opening to a relatively wide section of the lock-transit channel that is sized and used to receive the rearwardly extending headrest lock therein when the movable headrest is coupled to the headrest-mount platform during assembly of modular headrest unit. The guide plate and the tail-extension support insert cooperate to provide a generally flat vertically extending U-shaped surface located behind the movable headrest (and between the backrest and the movable headrest) during the full range of up-and-down motion of the movable headrest relative to the backrest while the rearwardly extending headrest lock travels up and down in the vertically extending lock-transit channel. A U-shaped inner edge of that generally flat vertically extending U-shaped surface provides a perimeter border for the vertically extending lock-transit channel.

In illustrative embodiments, the movable headrest includes a headrest cradle sized to receive the head of a child seated in the juvenile vehicle seat, a headrest tail extending downwardly from the headrest cradle in a direction toward the underlying seat bottom, and a spring-loaded headrest-tail extension that is able to move up and down relative to the headrest tail and remain in contact with the guide plate and the tail-extension support insert of the headrest-mount platform during up-and-down movement of the headrest cradle and the headrest tail relative to the seat bottom and the backrest.

In illustrative embodiments, the movable headrest is movable relative to the seat bottom between a LOW-ELEVATION position that places the head cradle in a position relatively close to the seat bottom to receive the head of a shorter child seated on the seat bottom and a HIGH-ELEVATION position that places the head cradle in an elevated location further away from the seat bottom to receive the head of a taller child seated on the seat bottom. The headrest-tail extension is spring-loaded by an extension spring included in the movable headrest so that the headrest-tail extension normally is moved relative to the headrest tail to assume an EXTENDED position extending below the headrest tail and toward the seat bottom when the movable headrest is moved to assume the HIGH-ELEVATION position.

In illustrative embodiments, as the movable headrest is lowered on the headrest-support platform to move closer to the seat bottom, a downwardly facing bottom edge of the headrest-tail extension will eventually engage an underlying and upwardly facing ledge portion of the juvenile seat that is positioned to lie at or near the seat bottom. Such engagement will stop further downward movement of the headrest-tail extension while allowing continued downward movement of the headrest tail relative to the now stationary headrest-tail extension thereby causing the headrest-tail extension to move relative to the companion headrest tail to assume a RETRACTED position located partly or fully between the headrest-mount platform coupled to the backrest and the headrest tail coupled to the head cradle. In the RETRACTED position, the headrest-tail extension is arranged to lie closer to the head cradle to cause the extension spring that normally acts against the headrest-tail extension and the headrest tail to yieldably urge the headrest-tail extension to assume the EXTENDED position to be stretched temporarily. The extension spring remains in this energy-storing STRETCHED state until the headrest tail along with the head cradle is moved upwardly away from the seat bottom in response to upward movement of the movable headrest so as to free the headrest-tail extension from engagement with the upwardly facing ledge portion of the juvenile vehicle seat. Such disengagement releases the stretched extension spring so that it can contract naturally and return to a normal CONTRACTED state so as to urge the headrest-tail extension to more relative to the headrest tail once again to assume the EXTENDED position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
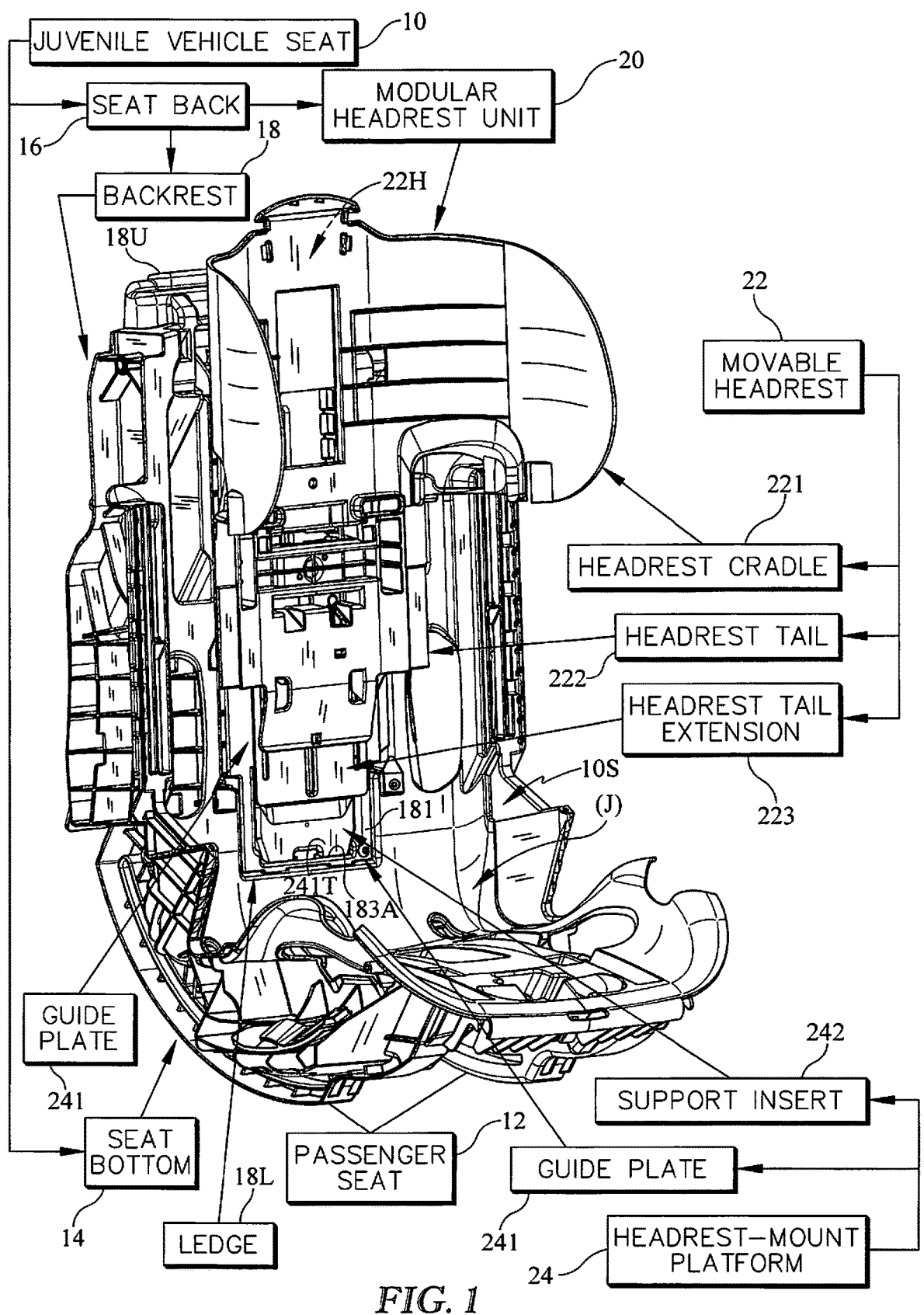
FIG. 1 is a partial perspective view of a child restraint in accordance to the present disclosure showing a modular headrest unit that has been mounted on a front side of backrest to form a seat back of a juvenile vehicle seat.

A juvenile vehicle seat 10, in accordance with the present disclosure, is shown in FIG. 1. Juvenile vehicle seat 10 may be arranged and retained on a passenger seat 12 of a vehicle (not shown) in either a forward-facing orientation or a rearward-facing orientation. Juvenile vehicle seat 10 includes a seat bottom 14 and a seat back 16 extending upwardly away from seat bottom 14. Seat back 16 includes a backrest 18 and a modular headrest unit 20 comprising a movable headrest 22 and a headrest-mount platform 24 as shown in FIG. 2.

Figure 2:
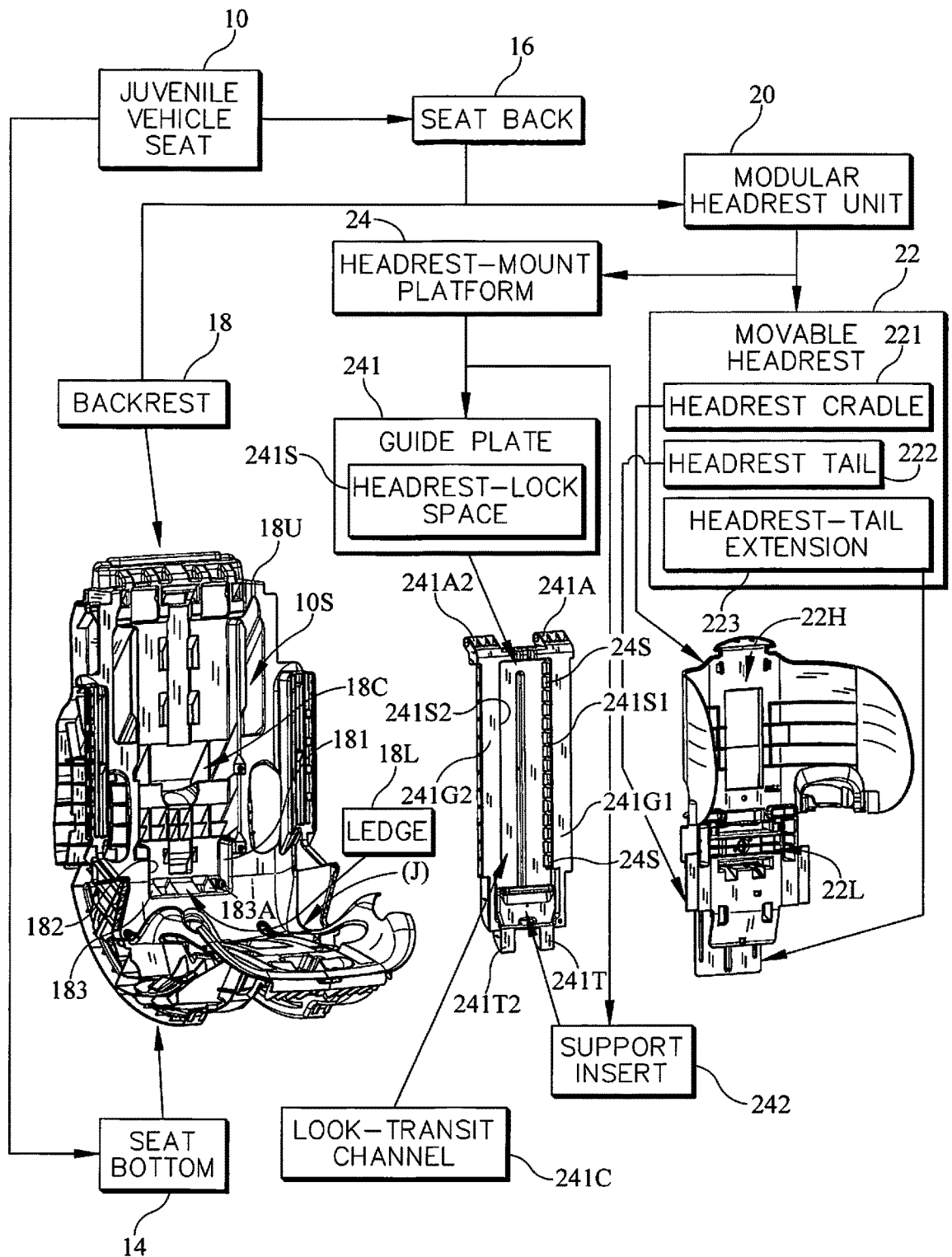
FIG. 2 is an exploded assembly view of the child restraint of FIG. 1 showing that the modular headrest unit comprises a headrest-mount platform that can be coupled to a front side of the backrest and a movable headrest that can be mounted on a front side of the headrest-mount platform for up-and-down movement to cause a head cradle included in the movable headrest to move between a HIGH-ELEVATION position shown in FIG. 3, an INTERMEDIATE position shown in FIG. 4, and a LOW-ELEVATION position shown in FIG. 5.

Modular headrest unit 20 is coupled to a front side 18F of backrest 18 of juvenile vehicle seat 10 as suggested in FIG. 2. Modular headrest unit 20 and backrest 18 cooperate to minimize gaps formed in backrest 18 when the movable headrest 22 included in modular headrest unit 20 moves upwardly and downwardly on backrest 18 relative to seat bottom 14 between a plurality of raised, lowered, and intermediate positions as suggested in FIGS. 3-5. Modular headrest unit 20 is compliant with Federal Motor Vehicle Safety Standards 213.

Figure 3:
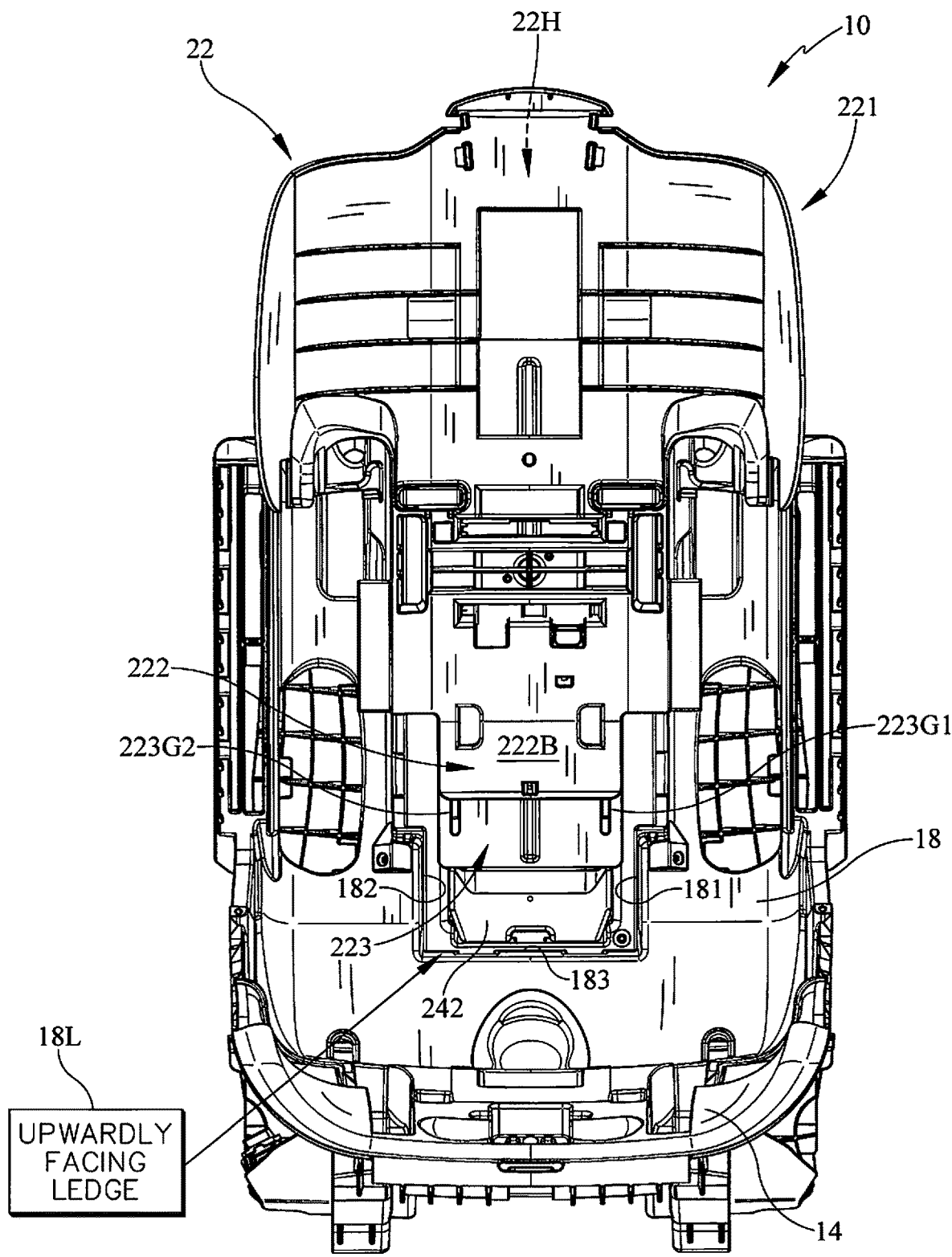
FIG. 3 is a front elevation view of the child restraint of FIGS. 1 and 2 showing the head cradle of the movable headrest in the HIGH-ELEVATION position.
Figure 4:
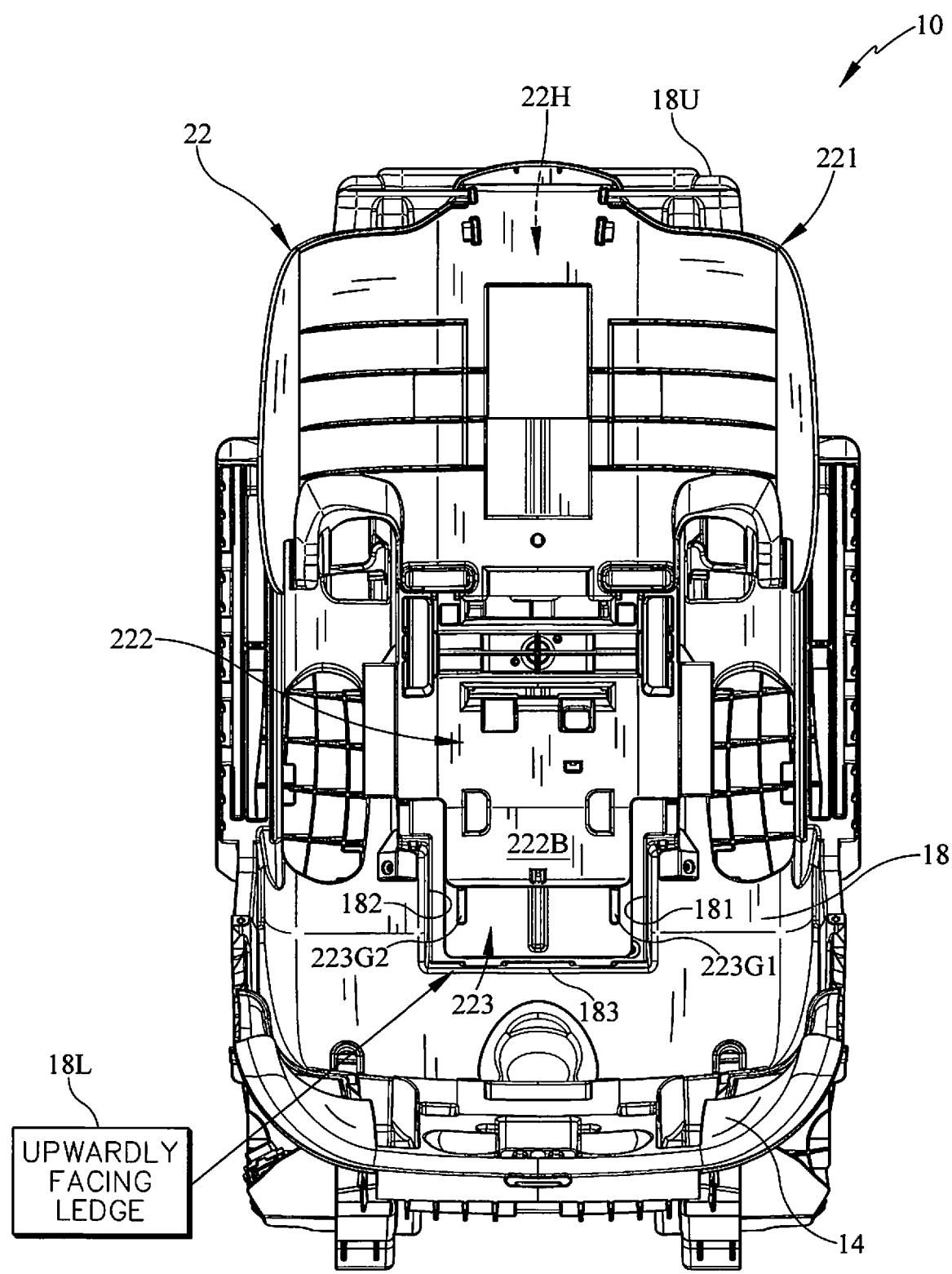
FIG. 4 is a view similar to FIG. 3 showing the head cradle of the movable headrest moved downwardly to the INTERMEDIATE position.
Figure 5:
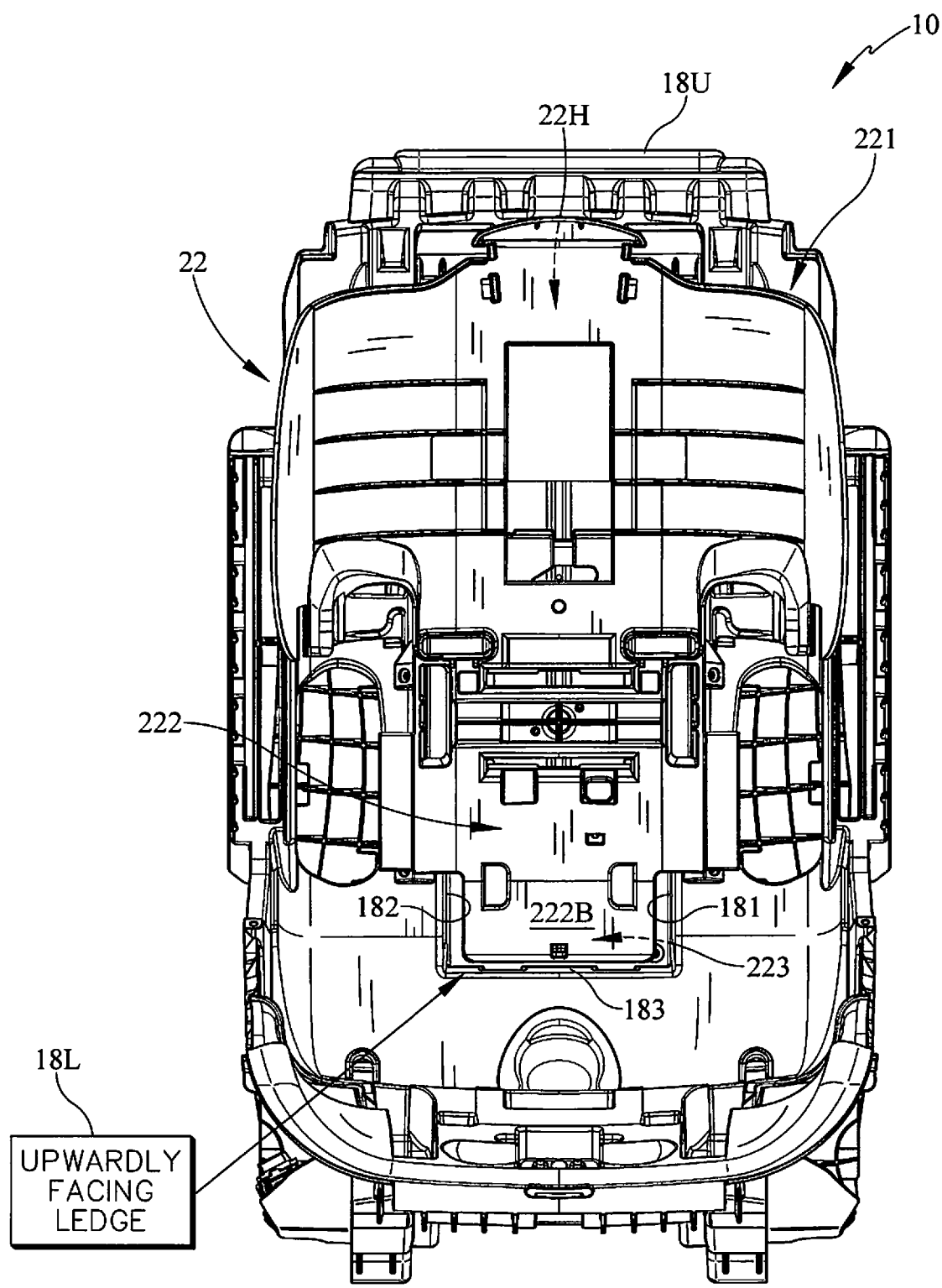
FIG. 5 is a view similar to FIG. 4 showing the head cradle of the movable headrest moved downwardly to a the LOW-ELEVATION position.

Modular headrest unit 20 includes a headrest-mount platform 24 coupled to front side 18F of backrest 18 and a movable headrest 22 coupled to headrest-mount platform 24 as suggested in FIGS. 1 and 2. The movable headrest 22 is configured to move upwardly and downwardly along a front side of headrest-mount platform 24 as shown in FIGS. 3-5. The movable headrest 22 is configured to provide a generally flat surface along backrest 18 so that no gaps greater than about 3/8 inch are exposed along backrest 18. The movable headrest 22 maintains the generally flat surface as the headrest 22 is moved up and down relative to backrest 18 from a fully raised HIGH-ELEVATION position as shown in FIG. 3 to a fully lowered LOW-ELEVATION position as shown in FIG. 5.

The movable headrest 22 includes a headrest cradle 221, a headrest tail 222, and a headrest-tail extension 223 as shown in FIG. 2. Headrest cradle 221 receives a head of a child therein when the child is seated on seat bottom 14 of juvenile vehicle seat 10. Headrest tail 222 extends downwardly away from headrest cradle 221 in a direction toward seat bottom 14 as shown in FIGS. 1 and 3. Headrest-tail extension 223 is coupled to headrest tail 222 and moves relative to headrest tail 222 as the movable headrest 22 moves toward a fully lowered LOW-ELEVATION position to maintain the generally flat surface established by the movable headrest 22 along the backrest 18 of juvenile vehicle seat 10 as shown in FIGS. 3-5.

Headrest-mount platform 24 includes a guide plate 241 and a tail-extension support insert 242 coupled to guide plate 241 as shown in FIG. 2. Tail-extension support insert 242 cooperates with guide plate 241, headrest tail 222, and headrest-tail extension 223 to maintain the generally flat surface as shown, for example, in FIG. 3 when the movable headrest 22 occupies the fully raised HIGH ELEVATION position. Tail-extension support insert 242 supports headrest-tail extension 223 as the movable headrest 22 moves up and down along backrest 18 as suggested in FIGS. 3-5. Tail-extension support insert 242 is coupled to guide plate 241 to lie in a fixed position along a lower portion of guide plate 241. Headrest-tail extension 223 translates or slides relative to headrest tail 222 as the movable headrest 22 moves along backrest 18 of juvenile vehicle seat 10.

Figure 6:
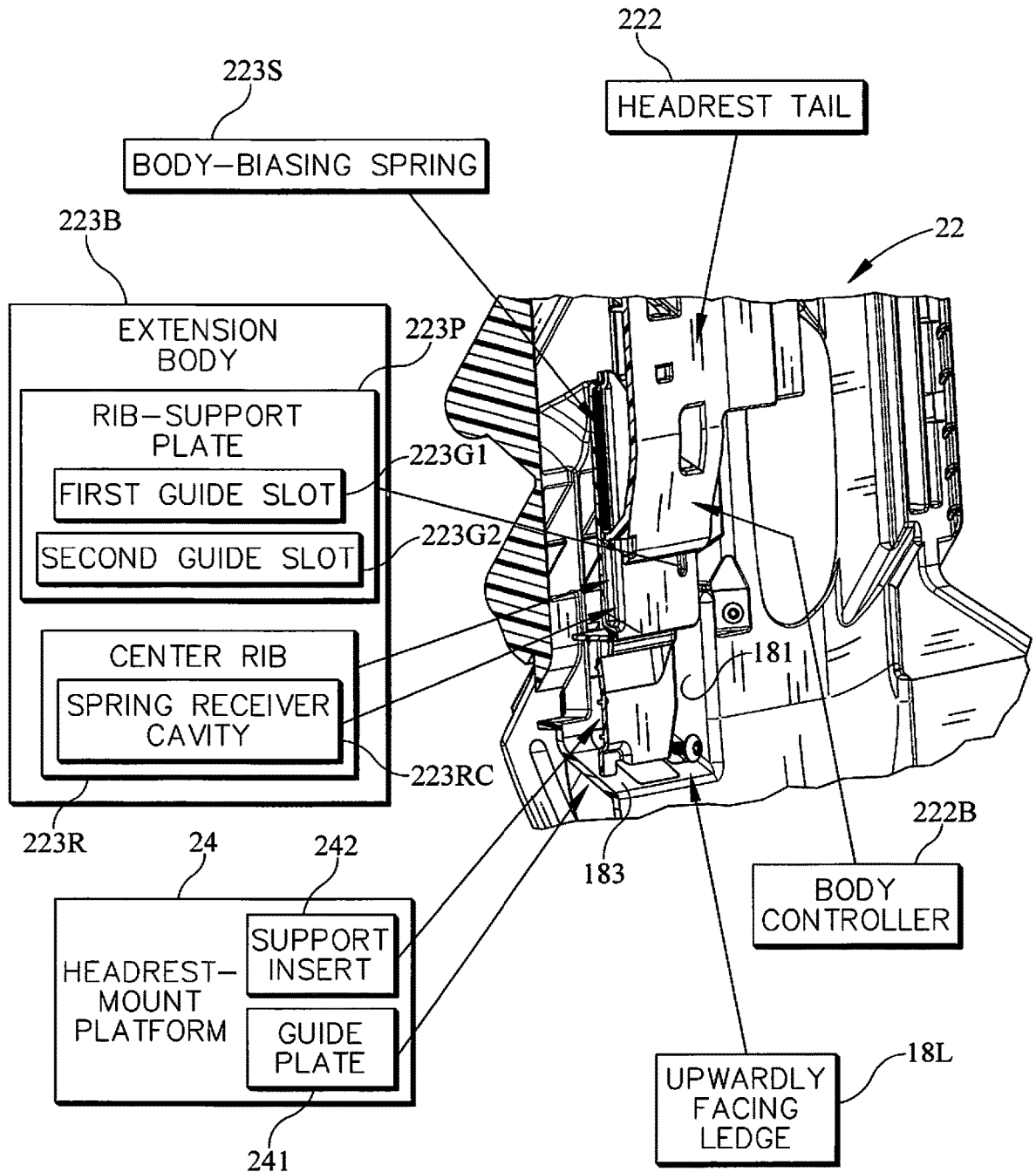
FIG. 6 is a sectional view taken along line 6-6 of FIG. 3.
Figure 9:
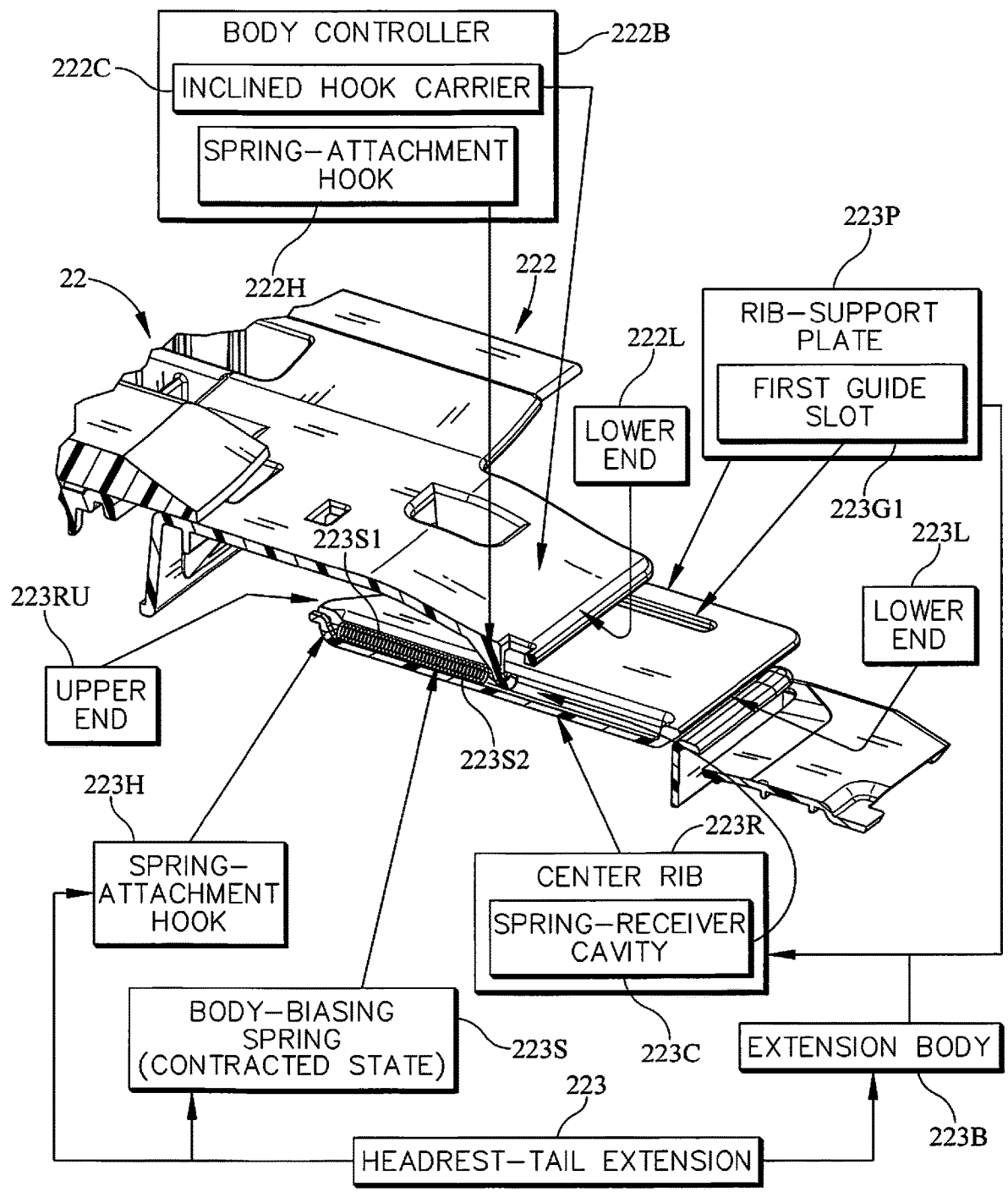
FIG. 9 is a sectional view taken along line 9-9 of FIG. 7 showing the extension spring of the movable headrest in a normally CONTRACTED state when the headrest-tail extension is in the EXTENDED position.

Headrest-tail extension 223 includes an extension body 223B comprising a rib-support plate 223P, a rearwardly extending rib 223R formed to include a forwardly facing spring-receiver cavity 223RC, and a spring-attachment hook 223H coupled to an upper end 223RD of the rib 223R as shown in FIGS. 6 and 9. Headrest-tail extension 223 also includes a body-biasing (extension) spring 223S shown in its normal CONTRACTED state in FIG. 9 and in its temporary STRETCHED state in FIG. 10.

Figure 7:
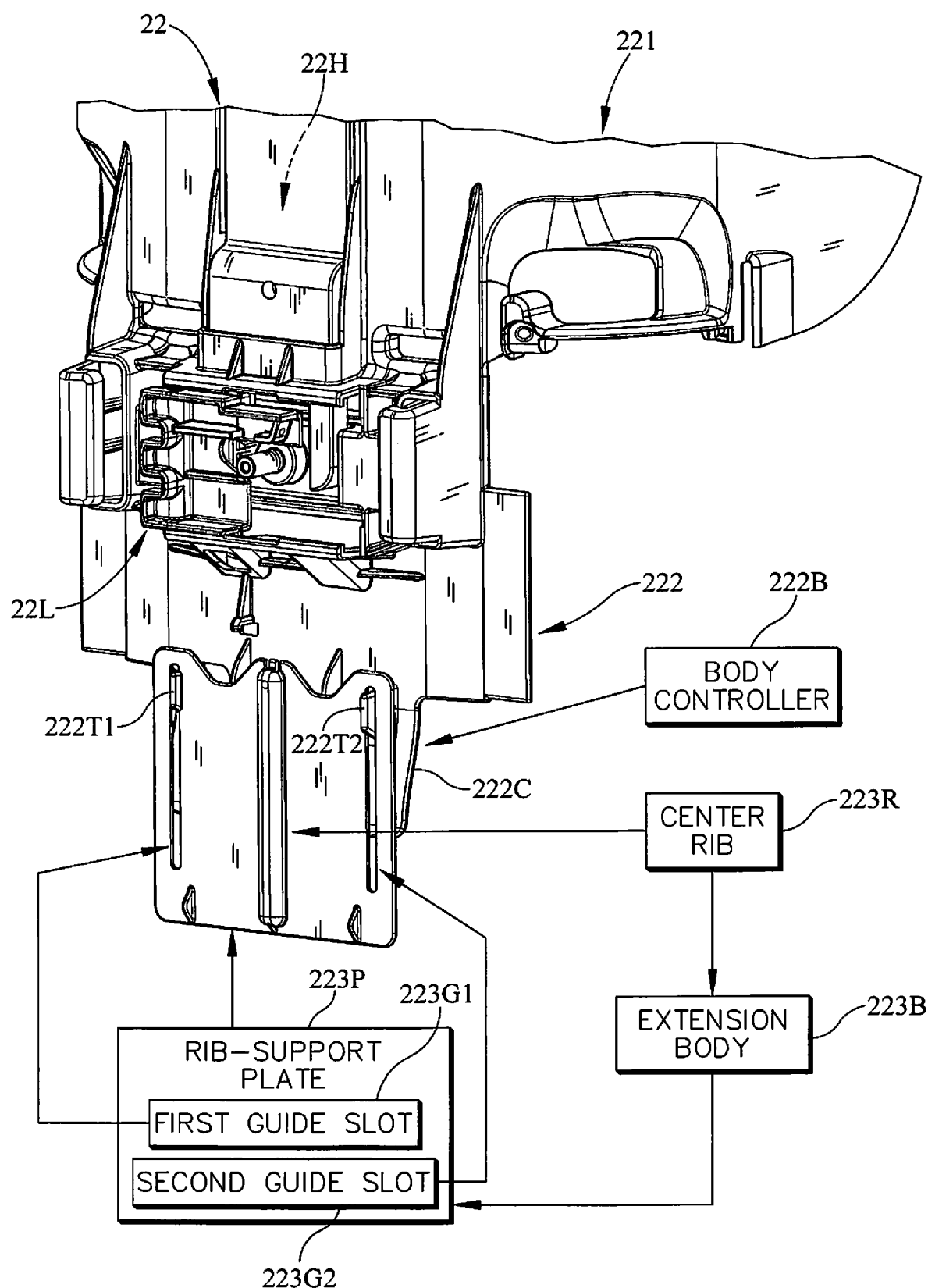
FIG. 7 is a rear perspective view of the movable headrest showing a headrest-tail extension in an EXTENDED position.
Figure 8:
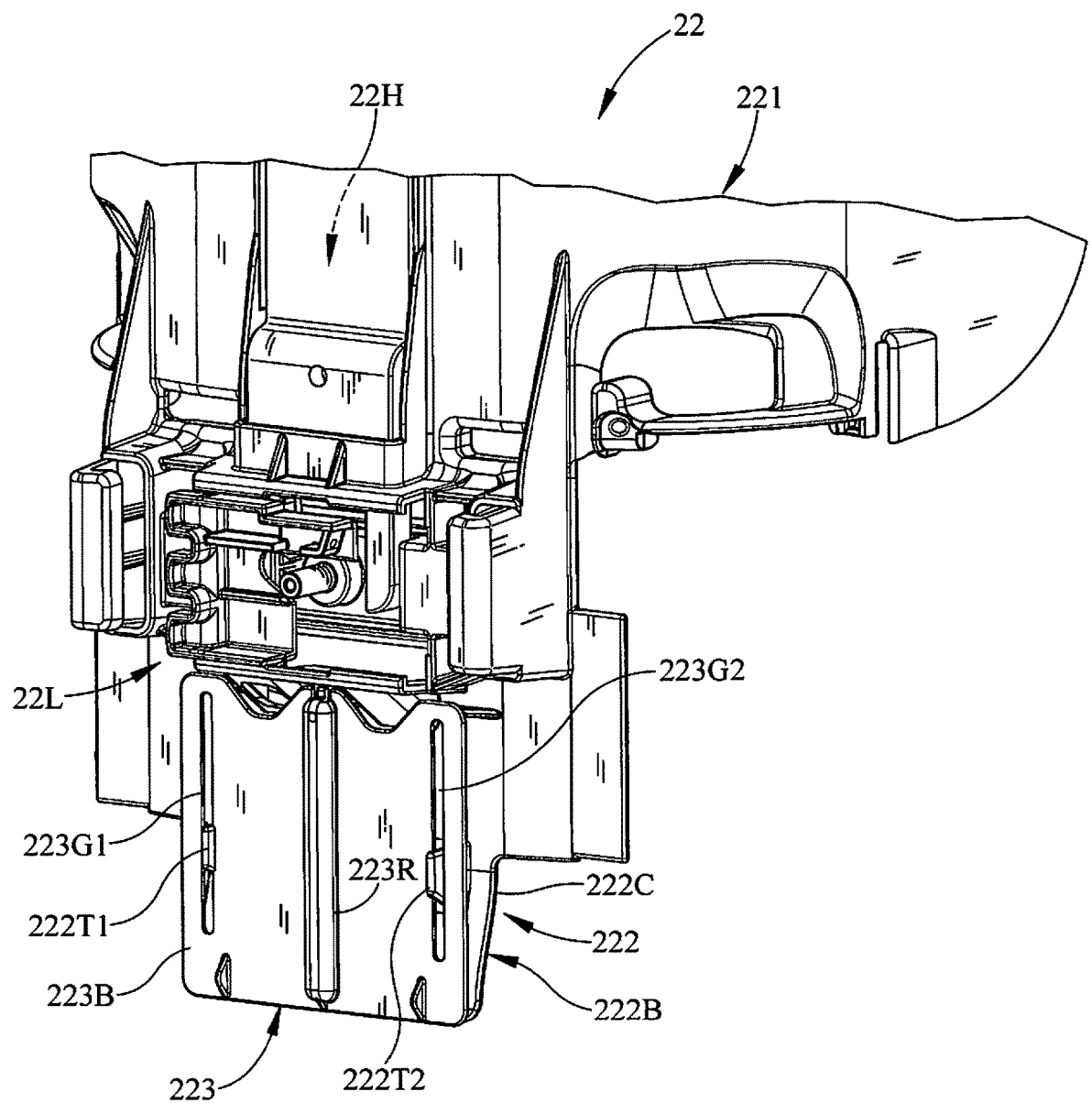
FIG. 8 is a view similar to FIG. 7 showing the headrest-tail extension arranged in a RETRACTED position.

Extension body 223B is square or rectangular and is formed to include first and second guide slots 223G1, 223G2 shaped to receive corresponding guide tabs 222T1, 222T2 formed on headrest tail 222 as suggested in FIGS. 7 and 8. Rib 223R is coupled to rib-support plate 223P to lie midway between and in spaced-apart parallel relation to first and second guide slots 223G1, 223G2 as shown in FIG. 7. Rib 223R extends rearwardly away from rib-support plate 223P toward backrest 18 as suggested in FIGS. 2 and 6.

Figure 10:
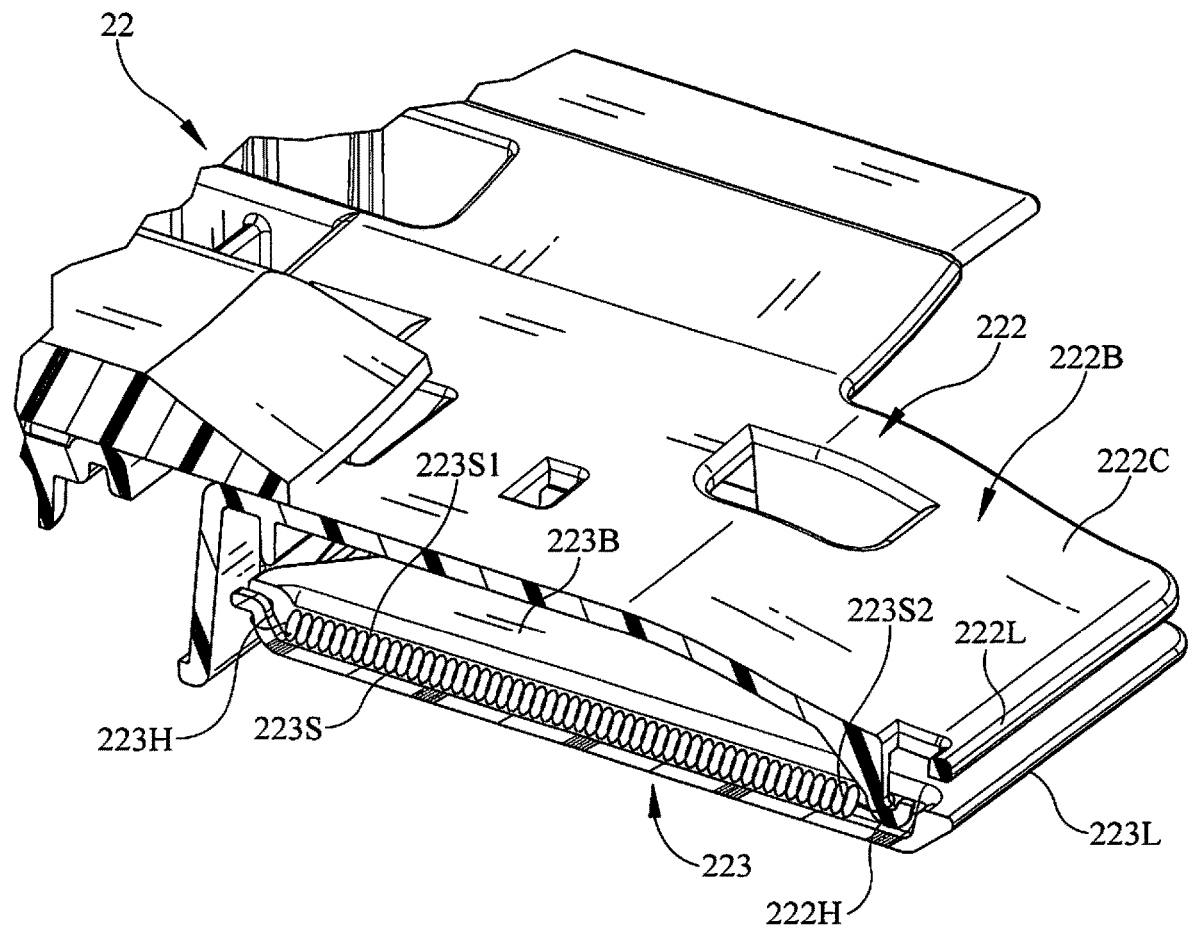
FIG. 10 is a sectional view taken along line 10-10 of FIG. 8 showing the extension spring of the movable headrest in a temporarily STRETCHED state when the headrest-tail extension is in the RETRACTED position.

Rib 223R is formed to include a spring-receiver cavity 223C sized to receive the body-biasing spring 223S therein as shown in FIGS. 6, 9, and 10. A first end 223S1 of the body-biasing spring 223S is attached to spring-attachment hook 223H of headrest-tail extension 223 and an opposite second end 223S2 of body-biasing spring 223S is attached to another spring-attachment hook 222H coupled to a lower end 222CL of an inclined hook carrier 222C of headrest tail 222 as suggested in FIGS. 9 and 10.

When the movable headrest 22 is in the fully raised HIGH-ELEVATION position, body-biasing spring 223S remains in a CONTRACTED state and pulls both spring-attachment hooks 222H, 223H toward one another causing headrest-tail extension 223 to extend downwardly away from headrest tail 222 and assume an EXTENDED position relative to the headrest tail 222 as shown in FIGS. 6 and 9. As a caregiver moves the movable headrest 22 downwardly on headrest-mount platform 24 from the fully raised HIGH-ELEVATION position toward the fully lowered LOW-ELEVATION position, a lower end 223L of headrest-tail extension 223 eventually comes into contact with an underlying upwardly facing ledge 18L of backrest 18 of juvenile vehicle seat 10 at or near a rear portion of seat bottom 14 of juvenile vehicle seat 10. As the movable headrest 22 continues moving downwardly, headrest tail 222 translates relative to headrest-tail extension 223 and overcomes the force of body-biasing spring 223S causing the two spring-attachment hooks 222H, 223H to move away from one another to stretch body-biasing spring 223S to assume a temporary STRETCHED state so as to allow extension body 223B to be moved upwardly relative to headrest tail 222 to a RETRACTED position behind headrest tail 222 as shown in FIG. 10.

In the fully raised HIGH-ELEVATION position, a lower end 223L of headrest-tail extension 223 is supported on an upper portion of tail-extension support insert 242 as suggested in FIG. 3. As the movable headrest 22 moves downwardly, headrest-tail extension 223 translates along the tail-extension support insert 242 until the lower end 223L of headrest-tail extension 223 engages an upwardly facing ledge 18L at or near seat bottom 14 of juvenile vehicle seat 10 and is arranged to lie in the INTERMEDIATE position shown in FIG. 4. Headrest tail 222 continues translating downwardly relative to tail-extension support insert 242 and headrest-tail extension 223 until the movable headrest 222 reaches the fully lowered LOW-ELEVATION position shown in FIG. 5.

The guide slots 223G1, 223G2 formed in rib-support plate 223P of extension body 223B provide a set range of vertical travel for headrest tail 222 relative to headrest-tail extension 223 as suggested in FIGS. 7 and 8. The guide tabs 222T1, 222T2 are included in headrest tail 222 and translate within the first and second guide slots 223G1, 223G2 formed in rib-support plate 223P as headrest tail 222 translates relative to headrest-tail extension 223. In the fully raised HIGH-ELEVATION position shown in FIGS. 3, 7, and 9, body-biasing spring 223S pulls the guide tabs 222T1, 222T2 into engagement with rib-support plate 223P of extension body 223B in an upper portion of the guide slots 223G1, 223G2. Headrest tail 222 translates downwardly until the guide tabs 222T1, 222T2 come into engagement with rib-support plate 223R of extension body 223B in a lower portion of the guide slots 223G1, 223G2 to locate the movable headrest 22 in the fully lowered LOW-ELEVATION position shown in FIG. 5.

Headrest-tail extension 223 of the present disclosure allows for movement of the movable headrest 22 while a child is seated in juvenile vehicle seat 10. As a result, the child's weight is directed more toward seat bottom 14 rather than headrest-tail extension 223 making it easier to adjust the movable headrest 22 while the child is sitting on the juvenile vehicle seat 10.

Guide plate 241 of headrest-mount platform 24 is formed to include a headrest-lock space 241S that is shaped to receive at least a portion of a lock 22L included in the movable headrest 22 during assembly of modular headrest unit 20. During assembly of modular headrest unit 20, at least a portion of the movable headrest 22 is inserted from the front into the lower, wider headrest-lock space 241S formed in guide plate 241. The movable headrest 22 is then able to be slid upwardly relative to guide plate 241 to couple the movable headrest 22 to guide plate 241 and locate the lock 22L in a vertically extending lock-transit channel 241C formed in guide plate 241. Next, headrest-tail extension 223 is translated upwardly to expose the lower, wider headrest-lock 241S space formed in guide plate 241. Tail-extension support insert 242 is then inserted into the lower, wider headrest lock space 241S formed in guide plate 241 and coupled to guide plate 241 to remain in a fixed position relative to guide plate 241 and cover and/or fill the opening provided by the lower, wider headrest-lock space 241S to provide headrest-mount platform 24 with a generally flat front surface. Headrest-tail extension 223 is then released allowing it to slide over and engage tail-extension support insert 242. Modular headrest unit 20 is then coupled to a front side 18F of backrest 18 to lie in a fixed position on the backrest 18.

In the present disclosure, headrest-tail extension 223 is included in the movable headrest 22 for up-and-down movement relative to backrest 18 of juvenile vehicle seat 10 as shown in FIGS. 3-5. Headrest-tail extension 223 is not connected permanently to juvenile vehicle seat 10 to lie in a stationary position on backrest 18. Instead, headrest-tail extension 223 is a telescoping structure that cooperates to provide a smooth surface behind the back of a child seated on seat bottom 14. In the present disclosure, a spring 223S is used to cause headrest-tail extension 223 to extend in a downward direction automatically as the movable headrest 22 is moved upwardly on backrest 18 away from seat bottom 14.

In illustrative embodiments, as the movable headrest 22 is lowered on headrest-support platform 24 to move closer to seat bottom 14, a downwardly facing bottom edge 223L of headrest-tail extension 223 will eventually engage an underlying and upwardly facing ledge 18L of the juvenile seat 10 that is positioned to lie at or near seat bottom 14 as suggested in FIGS. 4 and 5. Such engagement will stop further downward movement of headrest-tail extension 223 while allowing continued downward movement of headrest tail 222 relative to the now stationary headrest-tail extension 223 thereby causing headrest-tail extension 223 to move relative to the companion headrest tail 222 to assume a RETRACTED position located partly or fully between headrest-mount platform 24 coupled to backrest 18 and headrest tail 222 coupled to head cradle 221. In the RETRACTED position, headrest-tail extension 223 is arranged to lie closer to head cradle 221 to cause the extension spring 223S that normally acts against the headrest-tail extension 223 and headrest tail 222 to yieldably urge headrest-tail extension 223 to assume the EXTENDED position to be stretched temporarily as suggested in FIG. 10. The extension spring 223S remains in this energy-storing STRETCHED state until headrest tail 222 along with head cradle 221 is moved upwardly away from seat bottom 14 in response to upward movement of the movable headrest 12 so as to free headrest-tail extension 223 from engagement with the upwardly facing ledge 18L of juvenile vehicle seat 10. Such disengagement releases the stretched extension spring 223S so that it can contract naturally and return to a normal CONTRACTED state as suggested in FIG. 9 so as to urge headrest-tail extension 223 to more relative to headrest tail 222 once again to assume the EXTENDED position.

Juvenile vehicle seat 10 comprises a seat bottom 14 and a seat back 16 arranged to extend upwardly from seat bottom 14 to provide a child-seating space 10S for a child seated on seat bottom 14 as shown in FIG. 1. Seat back 16 includes an upright backrest 18 and a modular headrest unit 20. The upright backrest 18 is coupled to a rear portion of seat bottom 14 and formed to include a front side 18F to provide a boundary of the child-seating space 10S.

Modular headrest unit 20 is mounted on front side 18F of the upright backrest 18 and arranged to lie above seat bottom 14 as suggested in FIGS. 1 and 2. Modular headrest unit 20 includes a headrest-mount platform 24 coupled to front side 18F of the upright backrest 18 to lie in a stationary position on front side 18F of the upright backrest 18 and a movable headrest 22 mounted for slidable up-and-down movement on headrest-mount platform 24 toward and away from seat bottom 14 as suggested in FIGS. 3-5.

The movable headrest 22 includes a head cradle 221, a headrest tail 222 coupled to head cradle 221 to move up and down therewith, and a headrest-tail extension 223 as shown in FIG. 2. Headrest-tail extension 223 is mounted for slidable movement on headrest tail 222 between an EXTENDED position extending downwardly toward seat bottom 14 and below a lower end 222L of headrest tail 222 to cooperate with headrest tail 222 to cover gaps formed between the movable headrest 12, headrest-mount platform 24, and front side 18L of upright backrest 18 upon movement of head cradle 221 upwardly away from seat bottom 14 to a fully raised HIGH-ELEVATION position and a RETRACTED position lying between headrest-mount platform 24 and headrest tail 222 upon movement of head cradle 221 downwardly toward seat bottom 14 to a fully lowered LOW-ELEVATION position as shown in FIG. 5.

A lower end 223L of headrest-tail extension 223 is engaged to an upwardly facing ledge 18L included in the upright backrest 18 when head cradle 221 occupies the fully lowered LOW-ELEVATION position as shown in FIG. 5. Lower end 223L of headrest-tail extension 223 is disengaged from the upwardly facing ledge to lie above and in spaced-apart relation to the upwardly facing ledge 18L when head cradle 221 occupies the fully raised HIGH-ELEVATION position as shown in FIG. 3.

A lower end 222L of headrest tail 222 is engaged to the upwardly facing ledge 18L included in the upright backrest 18 when head cradle 221 occupies the fully lowered LOW-ELEVATION position as shown in FIG. 5. Lower end 222L is arranged to lie in spaced-apart relation to the upwardly facing ledge 18L to locate lower end 223L of the headrest-tail extension 2223 therebetween when head cradle 221 occupies the fully raised HIGH-ELEVATION position as shown in FIG. 3. Lower end 223L of headrest-tail extension 223 is engaged to the upwardly facing ledge 18L included in the upright backrest 18 and lower end 222L of headrest tail 222 is arranged to lie in spaced-apart relation to the upwardly facing ledge 18L when head cradle 221 occupies an INTERMEDIATE position located between the fully raised HIGH-ELEVATION position and the fully lowered LOW-ELEVATION position as shown in FIG. 4.

Front side 18F of the upright backrest 18 is formed to include a recessed platform-receiver chamber 18C that is sized to receive a rearwardly facing portion of the headrest-mount platform 24 as suggested in FIGS. 1 and 2. The recessed platform-receiver chamber 18C is arranged to extend upwardly between a junction (J) provided between seat bottom 14 and the upright backrest 18 and an upper portion 18U of the upright backrest 18 as suggested in FIG. 2. Front side 18F further includes a forwardly facing backrest wall including an inner edge that frames an opening into the recessed platform-receiver chamber 18C as suggested in FIGS. 3-5. Headrest-mount platform 24 of modular headrest unit 20 is anchored in a stationary position in the recessed platform-receiver chamber 18C to allow the movable headrest 22 to move up and down relative to seat bottom 14, the forwardly facing backrest wall, and headrest-mount platform 24.

Front side 18F of the upright backrest 18 includes a first chamber side wall 181, a second chamber side wall 182 arranged to lie in laterally spaced-apart relation to the first chamber side wall, and a bottom chamber wall 183 as shown in FIGS. 3-5. Bottom chamber wall 183 is arranged to extend between lower ends of the first and second chamber side walls 181, 182 and cooperate with the first and second chamber side walls 181, 182 to define a portion of a perimeter boundary of the recessed platform-receiver chamber 18C. Bottom chamber wall 183 is formed to include an upwardly facing tab-receiver aperture 183A as shown in FIG. 2.

Headrest-mount platform 24 includes a guide plate 241 configured to guide up-and-down movement of the movable headrest 22 relative to seat bottom 14 and a plate-alignment tab 241T coupled to a lower portion of guide plate 241 as shown in FIG. 2. Plate-alignment tab 241T is arranged to extend downwardly into the upwardly facing tab-receiver aperture 241A formed in the bottom chamber wall 183 of front side 18F of the upright backrest 18 to limit movement of guide plate 241 relative to the upright backrest 18 while headrest-mount platform 24 is anchored in the stationary position in the recessed platform-receiver chamber 18C on front side 18F of upright backrest 18 as suggested in FIG. 1.

The movable headrest 22 includes a head cradle 221, a headrest tail 222 coupled to head cradle 221, and a headrest-tail extension 223 mounted for slidable movement on headrest tail 222 as suggested in FIG. 2. Lower end 223L of headrest-tail extension is arranged to lie in spaced-apart relation to an upwardly facing ledge 18L provided on the bottom chamber wall 183 when head cradle 221 occupies a fully raised HIGH-ELEVATION position located at a first distance above seat bottom 14 as shown in FIG. 3. Lower end 223L of headrest-tail extension 223 is arranged to engage the upwardly facing ledge 18L when head cradle 221 occupies a fully lowered LOW-ELEVATION position located at a relatively smaller second distance above seat bottom 14 as shown in FIG. 5. Lower end 222L of headrest tail 222 is also arranged to engage the upwardly facing ledge 18L when head cradle 221 occupies the fully lowered LOW-ELEVATION position as shown in FIG. 5.

Headrest-mount platform 24 further includes a plate anchor 241A coupled to an upper portion of guide plate 241 and arranged to mate with the upright backrest 18 to limit movement of the upper portion of guide plate 241 relative to the upright backrest 18 as shown in FIG. 2. Guide plate 241 includes a first guide strip 241G1 arranged to extend between plate anchor 241A and plate-alignment tab 241T and a second guide strip 241G2 arranged to lie in laterally spaced-apart relation to first guide strip 241G1 to define a lock-transit channel 241C therebetween as shown in FIG. 2.

A headrest-height controller 22H is mounted on the movable headrest 22 for up-and-down movement with the movable headrest 22 relative to guide plate 241 as suggested in FIGS. 1 and 3-5. Headrest-height controller 22H includes a headrest lock 22L that is configured to extend into the lock-transit channel 241C formed between the first and second guide strips 241G1, 241G2 to engage guide plate 241 to lock the movable headrest 22 in a selected elevation position relative to headrest-mount platform 24.

Headrest-mount platform 24 further includes a first socket strip 241S1 formed to include a series of blocker-receiving sockets 24S and arranged to extend along first guide strip 241G1 to face toward the second guide strip 241G2 and a second socket strip 241S2 formed to include a series of blocker-receiving sockets 24S and arranged to extend along the second guide strip 241G2 to face toward the first socket strip 24151 as suggested in FIG. 2. Each of the opposing series of blocker-receiving sockets 24S open into lock-transit channel 241C as suggested in FIG. 2. Headrest-height controller 22H includes a headrest lock 22L that is mounted to move up and down in the lock-transit channel 241C during movement of the movable headrest 12 relative to headrest-mount platform 24 to engage and disengage the blocker-receiving sockets 24S formed in first and second socket strips 241S1, 241S2. First and second socket strips 241S1, 241S2 are arranged to lie between a portion of front side 18F of upright backrest 18 and headrest-tail extension 223 when head cradle 221 occupies the fully raised HIGH-ELEVATION position as suggested in FIG. 3.

The movable headrest 22 includes a headrest cradle 221 configured to receive the head of a child seated on seat bottom 14, a headrest tail 222 coupled to a lower portion of the headrest cradle 221 to move up and down with headrest cradle 221 and arranged to extend downwardly away from headrest cradle 221 toward seat bottom 14 to cover gaps formed between the movable headrest 22 and the upright backrest 18 as the movable headrest 22 is moved relative to the upright backrest 18 as suggested in FIGS. 3-5. Headrest-tail extension 223 is coupled to headrest tail 222 for up-and-down movement relative to headrest tail 222 between an EXTENDED position extending below headrest tail 222 and toward seat bottom 14 and a RETRACTED position lying behind headrest tail 222 between headrest tail 221 and headrest-mount platform 24.

Headrest cradle 221 and headrest tail 222 are arranged to move as a unit relative to seat bottom 14 from a fully raised HIGH-ELEVATION position located at a first distance above seat bottom 14 to a fully lowered LOW-ELEVATION position located at a relatively smaller second distance above seat bottom 14 as suggested in FIGS. 3-5. Headrest-tail extension 223 is arranged to lie in the EXTENDED POSITON relative to headrest tail 222 upon movement of headrest cradle 221 and headrest tail 222 as a unit to the fully raised HIGH-ELEVATION position. Headrest-tail extension 223 is arranged to lie in the RETRACTED position relative to headrest tail 222 upon movement of headrest cradle 221 and headrest tail 222 as a unit to the fully lowered LOW-ELEVATION position.

Headrest-tail extension 223 includes an extension body 223B that is mounted for relative movement on headrest tail 222 and an extensible body-biasing spring 223S having a first end 223S1 coupled to an upper portion 223RU of extension body 223B and a second end 223S2 coupled to a lower portion 222L of headrest tail 222 as suggested in FIG. 9. Extensible body-biasing spring 223S remains in a normal CONTRACTED state to pull the upper portion 223RU of extension body 223B toward the lower portion 222L of headrest tail 222 when headrest cradle 221 and headrest tail 221 occupy the fully raised HIGH-ELEVATION position shown in FIG. 3 to cause headrest-tail extension 223 to move relative to headrest tail 221 to the EXTENDED position. Extensible body-biasing spring 223S assumes a temporary stretched state in response to engagement of a lower end 223L of headrest-tail extension 223 with an upwardly facing ledge 18L included in the upright backrest 18 during downward movement of headrest cradle 221 and headrest tail 222 as a unit to the fully lowered LOW-ELEVATION position shown in FIG. 5.

Front side 18F of the upright backrest 18 includes an upwardly facing ledge 18L that is arranged to lie above and in spaced-apart relation to seat bottom 14. Head cradle 221 of the movable headrest 22 is movable up and down relative to headrest-mount platform 24 among a HIGH-ELEVATION position shown in FIG. 3 in which head cradle 221 is arranged to lie at a first distance from the upwardly facing ledge 18L, a LOW-ELEVATION position shown in FIG. 5 in which head cradle 221 is arranged to lie at a relatively smaller second distance from the upwardly facing ledge 18L, and an INTERMEDIATE position that is shown in FIG. 4 located between the HIGH-ELEVATION position and the LOW-ELEVATION position. Headrest-tail extension 223 includes a downwardly facing lower end 223L that is arranged to engage the upwardly facing ledge 18L of front side 18F of the upright backrest 18 when head cradle 221 occupies each of the INTERMEDIATE position and the LOW-ELEVATION position. Headrest-tail extension 223 is arranged to lie above and in spaced-apart relation to the upwardly facing ledge 18L of front side 18 of the upright backrest 18 when the head cradle 221 occupies the HIGH-ELEVATION position.

Headrest tail 222 includes a downwardly facing lower end 222L that is arranged to lie above and in spaced-apart relation to the downwardly facing lower end 223L of head-rest-tail extension 223 when head cradle 221 occupies the HIGH-ELEVATION position and the INTERMEDIATE position and in closely confronting side-by-side relation to the downwardly facing lower end 223L of headrest-tail extension 223L when head cradle 221 occupies the LOW-ELEVATION position. The downwardly facing lower end 222L of headrest tail 222 is arranged to engage the upwardly facing ledge 18L of front side 18 of the upright backrest 18 when the head cradle occupies the LOW-ELEVATION position.

Lower end 222L of headrest tail 222 is separated from the upwardly facing ledge 18L by a third distance that is smaller than the second distance referenced herein. Lower end 223L of headrest-tail extension 223 is separated from the upwardly facing ledge 18L by a fourth distance that is smaller than each of the second and third distances referenced herein when head cradle 221 occupies the HIGH-ELEVATION position.

Modular headrest unit 20 is mounted on a front side 18F of backrest 18 as suggested in FIGS. 1 and 2. Modular headrest unit 20 includes a headrest-mount platform 24 located in a stationary position on backrest 18 and arranged to extend upwardly in a direction away from seat bottom 14 toward an upper end 18U of backrest 18 and a movable headrest 22 mounted for up-and-down movement on a front side of headrest-mount platform 24. The movable headrest 22 includes a rearwardly extending headrest lock 22L that can be operated by a caregiver to engage any one of several vertically spaced-apart lock receivers 24S formed in headrest-mount platform 24 to establish the height of the movable headrest 22 above seat bottom 14.

Headrest-mount platform 24 includes a guide plate 241 formed to include a vertically extending lock-transit channel 241C sized to receive the rearwardly extending headrest lock 22L that is included in the movable headrest 22 during up-and-down movement of the movable headrest 12 relative to headrest-mount platform 24 as suggested in FIGS. 2 and 7. Each lock receiver 24S opens into the vertically extending lock-transit channel 241C to allow headrest lock 22L to extend into one of the lock receivers 24S when the movable headrest 22 arrives at an elevation associated with that lock receiver 24S. Headrest-mount platform 24 also includes a tail-extension support insert 242 that is mounted on a lower portion of guide plate 241. Tail-extension support insert 242 is configured to cover an opening to a relatively wide section of a headrest-lock space 241S that is associated with the lock-transit channel 241C and that is sized and used to receive the rearwardly extending headrest lock 22L therein when the movable headrest 22 is coupled to headrest-mount platform 24 during assembly of modular headrest unit 20.

Guide plate 241 and tail-extension support insert 242 cooperate to provide a flat vertically extending U-shaped surface located behind the movable headrest 22 and between backrest 18 and the movable headrest 22 during a full range of up-and-down motion of the movable headrest 22 relative to backrest 18 while the rearwardly extending headrest lock 22L travels up and down in the vertically extending lock-transit channel 241C. A U-shaped inner edge of the flat vertically extending U-shaped surface provides a perimeter border for the vertically extending lock-transit channel 241C.

The movable headrest 22 includes a headrest cradle 221 sized to receive the head of a child seated in the juvenile vehicle seat, a headrest tail 22 extending downwardly from headrest cradle 221 in a direction toward seat bottom 14, and a spring-loaded headrest-tail extension 223 that is able to move up and down relative to headrest tail 222 and remain in contact with guide plate 241 and the tail-extension support insert 242 of headrest-mount platform during up-and-down movement of headrest cradle 221 and headrest tail 222 relative to seat bottom 14 and backrest 18. The movable headrest 22 is movable relative to seat bottom 14 between a LOW-ELEVATION position that is shown in FIG. 5 and that places head cradle 221 in a position relatively close to seat bottom 14 to receive the head of a shorter child seated on seat bottom 14 and a HIGH-ELEVATION position that is shown in FIG. 3 and that places head cradle 221 in an elevated location further away from seat bottom 14 to receive the head of a taller child seated on seat bottom 14. Headrest-tail extension 223 is spring-loaded by an extension spring 223S included in the movable headrest 22 so that headrest-tail extension 223 normally is moved relative to headrest tail 222 to assume an EXTENDED position extending below headrest tail 221 and toward seat bottom 14 when the movable headrest 22 is moved to assume the HIGH-ELEVATION position.

Headrest-tail extension 223 cooperates with headrest tail 222 to provide a smooth surface behind a seated child when juvenile vehicle seat 10 is used in rear-facing mode. Headrest-tail extension 223 moves up and down and is spring-loaded to extend and retract automatically over the upper and lower range of headrest heights that are used in rear-facing mode.

Headrest-tail extension 223 attaches to headrest tail 222 with tabs 222T1, 222T2 of headrest tail 222 that snap-fit into guide slots 223G1, 223G2 of headrest-tail extension 223 to allow for a specified amount of up-and-down travel of headrest-tail extension 223 relative to headrest tail 222. One end of spring 223S is attached to headrest tail 222 and the other end of spring 223S is attached to headrest-tail extension 223. The tendency of spring 223S to stay in the relaxed, non-extended state causes headrest-tail extension 223 normally to be in the extended state. As the movable headrest 22 is lowered relative to backrest 18, headrest-tail extension 223 eventually contacts the upwardly facing ledge 186 and the force will overcome spring 223S and allow headrest-tail extension 223 to retract. As the movable headrest 22 is raised, the spring force will cause headrest-tail extension 223 to extend until its limit as determined by the length of guide slots 223G1, 223G2 has been reached.

The invention claimed is:

1. A juvenile vehicle seat comprising:
a seat bottom,
a seat hack arranged to extend upwardly from the seat bottom to provide a child-seating space for a child seated on the seat bottom, the seat back including an upright backrest and a modular headrest unit, the upright backrest being coupled to a rear portion of the seat bottom and formed to include a front side to provide a boundary of the child-seating space, and the modular headrest unit being mounted on the front side of the upright backrest and arranged to lie above the seat bottom,
wherein the modular headrest unit includes a headrest-mount platform coupled to the front side of the upright backrest to lie in a stationary position on the front side of the upright backrest and a movable headrest mounted for slidable up-and-down movement on the headrest-mount platform toward and away from the seat bottom, and
wherein the front side of the upright backrest is formed to include a recessed platform-receiver chamber that is sized to receive a rearwardly facing portion of the headrest-mount platform and that is arranged to extend upwardly between a junction provided between the seat bottom and the upright backrest and an upper portion of the upright backrest and the front side further includes a forwardly facing backrest wall including an inner edge that frames an opening into the recessed platform-receiver chamber and the headrest-mount platform of the modular headrest unit is anchored in a stationary position in the recessed platform-receiver chamber to allow the movable headrest to move up and down relative to the seat bottom, the forwardly facing backrest wall, and the headrest-mount platform.

2. The juvenile vehicle seat of claim 1, wherein the movable headrest includes a head cradle, a headrest tail coupled to the head cradle to move up and down therewith, and a headrest-tail extension mounted for slidable movement on the headrest tail between an extended gap-coverage position extending downwardly toward the seat bottom and below a lower end of the headrest tail to cooperate with the headrest tail to cover gaps formed between the movable headrest, the headrest-mount platform, and the front side of the upright backrest upon movement of the head cradle upwardly away from the seat bottom to a fully raised high-elevation position and a retracted storage position lying between the headrest-mount platform and the headrest tail upon movement of the head cradle downwardly toward the seat bottom to a fully lowered low-elevation position.

3. The juvenile vehicle seat of claim 2, wherein a lower end of the headrest-tail extension is engaged to an upwardly facing ledge included in the upright backrest when the head cradle occupies the fully lowered low-elevation position and the lower end of the headrest-tail extension is disengaged from the upwardly facing ledge to lie above and in spaced-apart relation to the upwardly facing ledge when the head cradle occupies the fully raised high-elevation position.

4. The juvenile vehicle seat of claim 3, wherein a lower end of the headrest tail is engaged to the upwardly facing ledge included in the upright backrest when the head cradle occupies the fully lowered low-elevation position and the lower end is arranged to lie in spaced-apart relation to the upwardly facing ledge to locate the lower end of the headrest-tail extension therebetween when the head cradle occupies the fully raised high-elevation position.

5. The juvenile vehicle seat of claim 4, wherein the lower end of the headrest-tail extension is engaged to the upwardly facing ledge included in the upright backrest and the lower end of the headrest tail is arranged to lie in spaced-apart relation to the upwardly facing ledge when the head cradle occupies an intermediate position located between the fully raised high-elevation position and the fully lowered low-elevation position.

6. The juvenile vehicle seat of claim 1, wherein the front side of the upright backrest includes a first chamber side wall, a second chamber side wall arranged to lie in laterally spaced-apart relation to the first chamber side wall, and a bottom chamber wall arranged to extend between lower ends of the first and second chamber side walls and cooperate with the first and second chamber side walls to define a portion of a perimeter boundary of the recessed platform-receiver chamber, the bottom chamber wall is formed to include an upwardly facing tab-receiver aperture, and the headrest-mount platform includes a guide plate configured to guide up-and-down movement of the movable headrest relative to the seat bottom and a plate-alignment tab coupled to a lower portion of the guide plate and arranged to extend downwardly into the upwardly facing tab-receiver aperture formed in the bottom chamber wall of the front side of the upright backrest to limit movement of the guide plate relative to the upright backrest while the headrest-mount platform is anchored in the stationary position in the recessed platform-receiver chamber.

7. The juvenile vehicle seat of claim 6, wherein the movable headrest includes a head cradle, a headrest tail coupled to the head cradle, and a headrest-tail extension mounted for slidable movement on the headrest tail and wherein a lower end of the headrest-tail extension is arranged to lie in spaced-apart relation to an upwardly facing ledge provided on the bottom chamber wall when the head cradle occupies a fully raised high-elevation position located at a first distance above the seat bottom and the lower end of the headrest-tail extension is arranged to engage the upwardly facing ledge when the head cradle occupies a fully lowered low-elevation position located at a relatively smaller second distance above the seat bottom.

8. The juvenile vehicle seat of claim 7, wherein a lower end of the headrest tail is also arranged to engage the upwardly facing ledge when the head cradle occupies the fully lowered low-elevation position.

9. The juvenile vehicle seat of claim 6, wherein the headrest-mount platform further includes a plate anchor coupled to an upper portion of the guide plate and arranged to mate with the upright backrest to limit movement of the upper portion of the guide plate relative to the upright backrest, the guide plate includes a first guide strip arranged to extend between the plate anchor and the plate-alignment tab and a second guide strip arranged to lie in laterally spaced-apart relation to the first guide strip to define a lock-transit channel therebetween, and further comprising a headrest-height controller mounted on the movable headrest for up-and-down movement with the movable headrest relative to the guide plate and configured to extend into the lock-transit channel formed between the first and second guide strips to engage the guide plate to lock the movable headrest in a selected elevation positon relative to the headrest-mount platform.

10. The juvenile vehicle seat of claim 9, wherein the headrest-mount platform further includes a first socket strip formed to include a series of blocker-receiving sockets and arranged to extend along the first guide strip to face toward the second guide strip and a second socket strip foamed to include a series of blocker-receiving sockets and arranged to extend along the second guide strip to face toward the first socket strip, the headrest-height controller includes a headrest lock that is mounted to move up and down in the lock-transit channel during movement of the movable headrest relative to the headrest-mount platform to engage and disengage the blocker-receiving sockets foi lied in the first and second socket strips, and the first and second socket strips are arranged to lie between a. portion of the front side of the upright backrest and the headrest-tail extension when the head cradle occupies the fully raised high-elevation position.

11. A juvenile vehicle seat comprising:
a seat bottom,
a seat back arranged to extend upwardly from the seat bottom to provide a child-seating space for a child seated on the seat bottom, the seat back including an upright backrest and a modular headrest unit, the upright backrest being coupled to a rear portion of the seat bottom and formed to include a front side to provide a boundary of the child-seating space, and the modular headrest unit being mounted on the front side of the upright backrest and arranged to lie above the seat bottom,
wherein the modular headrest unit includes a headrest-mount platform coupled to the front side of the upright backrest to lie in a stationary position on the front side of the upright backrest and a movable headrest mounted for slidable up-and-down movement on the headrest- mount platform toward and away from the seat bottom, and
wherein the movable headrest includes a headrest cradle configured to receive the head of a child seated on the seat bottom, a headrest tail coupled to a lower portion of the headrest cradle to move up and down with the headrest cradle and arranged to extend downwardly away from the headrest cradle toward the seat bottom to cover gaps formed between the movable headrest and the upright backrest as the movable headrest is moved relative to the upright backrest, and a headrest-tail extension that is coupled to the headrest tail for up-and-down movement relative to the headrest tail between an extended position extending below the headrest tail and toward the seat bottom and a retracted position.

12. The juvenile vehicle seat of claim 11, wherein the headrest cradle and the headrest tail are arranged to move as a unit relative to the seat bottom from a fully raised high-elevation position located at a first distance above the seat bottom to a fully lowered low-elevation position located at a relatively smaller second distance above the seat bottom, the headrest-tail extension is arranged to lie in the extended positon relative to the headrest tail upon movement of the headrest cradle and headrest tail as a unit to the fully raised high-elevation position, and the headrest-tail extension is arranged to lie in the retracted position relative to the headrest tail upon movement of the headrest cradle and headrest tail as a unit to the fully lowered low-elevation position.

13. The juvenile vehicle seat of claim 12, wherein the headrest-tail extension includes an extension body that is mounted for relative movement on the headrest tail and an extensible body-biasing spring having a first end coupled to an upper portion of the extension body and a second end coupled to a lower portion of the headrest tail and wherein the extensible body-biasing spring remains in a normal contracted state to pull the upper portion of the extension body toward the lower portion of the headrest tail when the headrest cradle and headrest tail occupy the fully raised high-elevation position to cause the headrest-tail extension to move relative to the headrest tail to the extended position and wherein the extensible body-biasing spring assumes a temporary stretched state in response to engagement of a lower end of the headrest-tail extension with an upwardly facing ledge included in the upright backrest during downward movement of the headrest cradle and the headrest tail as a unit to the fully lowered low-elevation position.

14. The juvenile vehicle seat of claim 11, wherein the front side of the upright backrest includes an upwardly facing ledge that is arranged to lie above and in spaced-apart relation to the seat bottom, the head cradle of the movable headrest is movable up and down relative to the headrest-mount platform among a high-elevation position in which the head cradle is arranged to lie at a first distance from the upwardly facing ledge, a low-elevation position in which the head cradle is arranged to lie at a relatively smaller second distance from the upwardly facing ledge, and an intermediate position that is located between the high-elevation position and the low-elevation position and wherein the headrest-tail extension includes a downwardly facing lower end that is arranged to engage the upwardly facing ledge of the front side of the upright backrest when the head cradle occupies each of the intermediate position and the low-elevation position and that is arranged to lie above and in spaced-apart relation to the upwardly facing ledge of the front side of the upright backrest when the head cradle occupies the high-elevation position.

15. The juvenile vehicle seat of claim 14, wherein the headrest tail includes a downwardly facing lower end that is arranged to lie above and in spaced-apart relation to the downwardly facing lower end of the headrest-tail extension when the head cradle occupies the high-elevation position and the intermediate position and in closely confronting side-by-side relation to the downwardly facing lower end of the headrest-tail extension when the head cradle occupies the low-elevation position.

16. The juvenile vehicle seat of claim 15, wherein the downwardly facing lower end of the headrest tail is arranged to engage the upwardly facing ledge of the front side of the upright backrest when the head cradle occupies the low-elevation position.

17. The juvenile vehicle seat of claim 14, wherein the lower end of the headrest tail is separated from the upwardly facing ledge by a third distance that is smaller than the second distance and the lower end of the headrest-tail extension is separated from the upwardly facing ledge by a fourth distance that is smaller than each of the second and third distances when the head cradle occupies the high-elevation position.

18. A juvenile vehicle seat comprising:
a seat bottom,
a backrest arranged to extend upwardly from the seat bottom, and
a modular headrest unit mounted on a front side of the backrest, the modular headrest unit includes a headrest-mount platform located in a stationary position on the backrest and arranged to extend upwardly in a direction away from the seat bottom toward an upper end of the backrest and a movable headrest mounted for up-and-down movement on a front side of the headrest-mount platform, the movable headrest including a rearwardly extending headrest lock that can be operated by a caregiver to engage any one of several vertically spaced-apart lock receivers formed in the headrest-mount platform to establish the height of the movable headrest above the seat bottom,
wherein the headrest-mount platform includes a guide plate formed to include a vertically extending lock-transit channel sized to receive the rearwardly extending headrest lock that is included in the movable headrest during up-and-down movement of the movable headrest relative to the headrest-mount platform, each lock receiver opens into the vertically extending lock-transit channel to allow the headrest lock to extend into one of the lock receivers when the movable headrest arrives at an elevation associated with that lock receiver, and the headrest-mount platform also includes a tail-extension support insert that is mounted on a lower portion of the guide plate, the tail-extension support insert is configured to cover an opening to a relatively wide section of headrest-lock space associated with the lock-transit channel and that is sized and used to receive the rearwardly extending headrest lock therein when the movable headrest is coupled to the headrest-mount platform during assembly of the modular headrest unit, the guide plate and the tail-extension support insert cooperate to provide a flat vertically extending U-shaped surface located behind the movable headrest and between the backrest and the movable headrest during a full range of up-and-down motion of the movable headrest relative to the backrest while the rearwardly extending headrest lock travels up and down in the vertically extending lock-transit channel.

19. The juvenile vehicle seat of claim 18, wherein a U-shaped inner edge of the flat vertically extending U-shaped surface provides a perimeter border for the vertically extending lock-transit channel.

20. The juvenile vehicle seat of claim 18, wherein the movable headrest includes a headrest cradle sized to receive the head of a child seated in the juvenile vehicle seat, a headrest tail extending downwardly from the headrest cradle in a direction toward the seat bottom, and a spring-loaded headrest-tail extension that is able to move up and down relative to the headrest tail and remain in contact with the guide plate and the tail-extension support insert of the headrest-mount platform during up-and-down movement of the headrest cradle and the headrest tail relative to the seat bottom and the backrest.

21. The juvenile vehicle seat of claim 20, wherein the movable headrest is movable relative to the seat bottom between a low-elevation position that places the head cradle in a position relatively close to the seat bottom to receive the head of a shorter child seated on the seat bottom and a high-elevation position that places the head cradle in an elevated location further away from the seat bottom to receive the head of a taller child seated on the seat bottom, and the headrest-tail extension is spring-loaded by an extension spring included in the movable headrest so that the headrest-tail extension normally is moved relative to the headrest tail to assume an extended position extending below the headrest tail and toward the seat bottom when the movable headrest is moved to assume the high-elevation position.

22. The juvenile vehicle seat of claim 11, wherein, when in the retracted position, the headrest-tail extension is arranged to behind the headrest tail between the headrest tail and the headrest-mount platform.

23. The juvenile vehicle seat of claim 11, wherein the headrest cradle is arranged to move relative to the seat bottom from a fully raised high-elevation position located at a first distance above the seat bottom to a fully lowered low-elevation position located at a relatively smaller second distance above the seat bottom, the headrest-tail extension is arranged to lie in the extended positon relative to the headrest tail in the fully raised high-elevation position, and the headrest-tail extension is arranged to lie in the retracted position relative to the headrest tail in the fully lowered low-elevation position.

\* \* \* \* \*